(12) United States Patent
Lu et al.

(10) Patent No.: US 12,302,323 B2
(45) Date of Patent: May 13, 2025

(54) METHOD FOR DATA TRANSMISSION ON SIDELINK, TERMINAL APPARATUS, AND STORAGE MEDIUM THEREOF

(71) Applicant: GUANGDONG OPPO MOBILE TELECOMMUNICATIONS CORP., LTD., Dongguan (CN)

(72) Inventors: Qianxi Lu, Dongguan (CN); Huei-Ming Lin, South Yarra (AU); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 242 days.

(21) Appl. No.: 17/862,522

(22) Filed: Jul. 12, 2022

(65) Prior Publication Data

US 2022/0346119 A1 Oct. 27, 2022

Related U.S. Application Data

(63) Continuation of application No. PCT/CN2020/071820, filed on Jan. 13, 2020.

(51) Int. Cl.
*H04W 72/20* (2023.01)
*H04L 1/1812* (2023.01)
(Continued)

(52) U.S. Cl.
CPC ........... *H04W 72/20* (2023.01); *H04L 1/1812* (2013.01); *H04W 72/02* (2013.01); *H04W 92/18* (2013.01)

(58) Field of Classification Search
CPC ..... H04W 72/20; H04W 72/02; H04W 92/18; H04W 4/46; H04W 4/40; H04L 1/1812; H04L 1/1864; H04L 5/0055; H04L 1/1861

See application file for complete search history.

(56) References Cited

U.S. PATENT DOCUMENTS 12,108,386 B2 * 10/2024 Lou ........................ H04W 72/23
2019/0053251 A1 2/2019 Loehr et al.
(Continued)

FOREIGN PATENT DOCUMENTS

CN 108923894 A 11/2018
CN 109152025 A 1/2019
(Continued)

OTHER PUBLICATIONS

First Office Action issued in corresponding Japanese application No. 2022-542476, mailed Sep. 1, 2023.
(Continued)

*Primary Examiner* — Tejis Daya
(74) *Attorney, Agent, or Firm* — BAYES PLLC (57) ABSTRACT

The present application relates to the technical field of communications. Provided in embodiments of the present disclosure are a data transmission method, a terminal apparatus, and a storage medium. A data transmission method provided in an embodiment of the present disclosure comprises: determining a target logical channel from one or more logical channels according to configuration indication information of a sidelink resource and attribute indication information of the one or more logical channels, the configuration indication information indicating a configuration feature of the sidelink resource, and the attribute indication information of the respective logical channels indicating whether data on the respective logical channels requires HARQ feedback; and using the sidelink resource to transmit data on the target logical channel. The data transmission method provided in the embodiment of the present disclosure can adapt to a data retransmission mechanism based on HARQ feedback.

14 Claims, 3 Drawing Sheets

(51) Int. Cl.
*H04W 72/02* (2009.01)
*H04W 92/18* (2009.01)

(56) References Cited

U.S. PATENT DOCUMENTS

| | | | |
|---|---|---|---|
| 2019/0190662 A1 | 6/2019 | Lee et al. | |
| 2020/0170023 A1* | 5/2020 | Kim | H04W 72/20 |
| 2020/0229145 A1* | 7/2020 | Kang | H04W 4/40 |
| 2022/0039127 A1* | 2/2022 | Li | H04W 72/1268 |
| 2022/0173840 A1* | 6/2022 | Wang | H04L 5/0055 |
| 2022/0232523 A1* | 7/2022 | Lee | H04L 47/125 |
| 2022/0264533 A1* | 8/2022 | Zhang | H04L 1/1812 |
| 2023/0063556 A1* | 3/2023 | Cho | H04W 72/569 |

FOREIGN PATENT DOCUMENTS

| | | |
|---|---|---|
| CN | 110178389 A | 8/2019 |
| CN | 110366260 A | 10/2019 |
| CN | 110545533 A | 12/2019 |
| EP | 4231561 B1 | 10/2024 |
| JP | 7476318 B2 | 4/2024 |

OTHER PUBLICATIONS

3GPP TSG RAN WG2 Meeting #108 Reno, USA, Nov. 18-22, 2019; R2-1914539 Title: Left issues for MAC in NR V2X; Source: ZTE, Sanechips.

Second Office Action issued in corresponding Japanese application No. 2022-542476, mailed Dec. 15, 2023.

Source: Huawei, HiSilicon; Title: Remaining issues on sidelink LCP procedure 3GPP TSG-RAN WG2 #107bis R2-1913711 Chongqing, China, Oct. 14-18, 2019.

"Introduction of V2X in NR", R1-1913680, Source: Samsung, 3GPP TSG-RAN WG1 Meeting #99, Reno, USA, Nov. 18-22, 2019, 17 pages.

International Search Report from the International Searching Authority Re. Application No. PCT/CN2020/071820, mailed Jul. 23, 2020, 4 pages.

Written Opinion from the International Searching Authority Re. Application No. PCT/CN2020/071820, mailed Jul. 23, 2020, 10 pages.

"New SID: Study on NR V2X", RP-181480, Source: Vodafone, 3GPP TSG RAN Meeting #80, La Jolla, USA, Jun. 11-14, 2018, 5 pages.

"Support of HARQ procedure over sidelink", R2-1913327, Source: Ericsson, 3GPP TSG-RAN WG2 #107bis, Chongqing, China, Oct. 14-18, 2019, 10 pages.

"Uu-based sidelink resource allocation", R1-1910533, Source: Ericsson, 3GPP TSG-RAN WG1 Meeting #98bis, Chongqing, China, Oct. 14-20, 2019, 18 pages.

Extended European Search Report issued in corresponding European application No. 20914648.9, mailed Nov. 16, 2022.

First Office Action issued in corresponding Indian application No. 202217039896, mailed Nov. 29, 2022.

Ericsson, "Uu-based sidelink resource allocation", R1-1912598, 3GPP TSG-RAN WG1 Meeting #99 Reno, NV, US 18th-22nd 2019.

Notice of Allowance issued in corresponding Japanese application No. 2022-542476, mailed Apr. 5, 2024.

Priority Review issued in corresponding Chinese application No. 202211187705.X, mailed Apr. 25, 2024.

First Office Action issued in corresponding Chinese application No. 202211187705.X, mailed May 21, 2024.

Notice of Grant of Invention of Patent Right issued in corresponding Chinese Application No. 202211187705.X, mailed Jul. 23, 2024, 2 pages.

First Office Action issued in corresponding Vietnamese Application No. 1-2022-04905, dated Aug. 28, 2024, 4 pages.

First Office Action issued in corresponding Indonesian Application No. P00202207927, mailed Dec. 17, 2024, 5 pages.

First Office action issued in corresponding Singapore Application No. 11202251072G, mailed Dec. 24, 2024, 9 pages.

Communication pursuant to Article 94(3) EPC issued in corresponding European Application No. 20914648.9, mailed Feb. 5, 2025, 9 pages.

Request for the Submission of an Opinion issued in corresponding Korean Application No. 10-2022-7024047, mailed on Apr. 1, 2025, 11 pages.

* cited by examiner

METHOD FOR DATA TRANSMISSION ON SIDELINK, TERMINAL APPARATUS, AND STORAGE MEDIUM THEREOF

CROSS REFERENCE TO RELATED APPLICATION

The present application is a continuation of International Application No. PCT/CN2020/071820, filed on Jan. 13, 2020, the content of which is incorporated herein by reference in its entirety.

TECHNICAL FIELD

The present application relates to the field of communication technologies, and in particular, to a method for data transmission, a terminal device and a storage medium.

BACKGROUND

With the development of the Internet of Things (IoT) technology, the device-to-device (D2D) communication has become a common communication mode. Sidelink is a new communication link introduced to support the D2D communication.

Currently, in the latest D2D research, technicians are considering introducing data retransmission mechanism based on hybrid automatic repeat request (HARQ) feedback on the sidelink.

How to accomplish the transmission of data on the sidelink such that the mode of data transmission can be adapted to the data retransmission mechanism based on HARQ feedback described above has become an urgent problem to be solved.

SUMMARY

Embodiments of the present application provide a method for data transmission, a terminal device and a storage medium.

In a first aspect, there is provided a method for data transmission, including: determining a target logical channel from one or more logical channels according to configuration indication information of a sidelink resource and attribute indication information of the one or more logical channels, where the configuration indication information is configured to indicate configuration characteristics of the sidelink resource, and the attribute indication information of each logical channel is configured to indicate whether data on the logical channel requires hybrid automatic repeat request (HARQ) feedback; and transmitting data on the target logical channel using the sidelink resource.

In a second aspect, there is provided a terminal device, including: a determination module, configured to determine a target logical channel from one or more logical channels according to configuration indication information of a sidelink resource and attribute indication information of the one or more logical channels, where the configuration indication information is configured to indicate configuration characteristics of the sidelink resource, and the attribute indication information of each logical channel is configured to indicate whether data on the logical channel requires hybrid automatic repeat request (HARQ) feedback; and a transmission module, configured to transmit data on the target logical channel using the sidelink resource.

In a third aspect, there is provided a terminal device, including a memory and a processor, where the memory is configured to store a computer program, and the processor is configured to implement steps of the method described in the first aspect when executing the computer program.

In a fourth aspect, there is provided a computer readable storage medium on which a computer program is stored, where the computer program is configured to implement steps of the method described in the first aspect when executed by a processor.

In a fifth aspect, there is provided a chip, including a programmable logic circuitry and/or program instructions, where the chip is configured to implement steps of the method described in the first aspect when running.

The beneficial effects brought out by the technical solutions provided by embodiments of the present application are at least as follows.

UE determines a target logical channel from one or more logical channels according to configuration indication information of a sidelink resource and attribute indication information of the one or more logical channels, and transmits data on the target logical channel using the sidelink resource. The configuration indication information is configured to indicate configuration characteristics of the sidelink resource, and the attribute indication information of each logical channel is configured to indicate whether data on the logical channel requires HARQ feedback. In this way, UE may determine the data that can be transmitted via the sidelink resource according to the configuration characteristics of the sidelink resource and whether the data on the logical channel requiring HARQ feedback. Thus, the data transmission on the sidelink can be adapted to the data retransmission mechanism based on HARQ feedback.

DETAILED DESCRIPTION

In order to make the object, technical solutions and advantages of the present application more clear, embodiments of the present application will be further described in detail below in combination with the accompanying drawings.

With the development of the Internet of Things (IoT) technology, device-to-device communication (D2D communication) has become a common communication mode.

In the 3GPP organization, D2D communication has gone through multiple different research phases, including proximity based service (ProSe) research phase, vehicle to everything (V2X) research phase, and Further Enhancement to device-to-device (FeD2D) research phase.

ProSe is mainly used for the public security service, V2X is mainly used for the vehicle to vehicle communication services and the vehicle to human communication services, and FeD2D is mainly used for a scenario where a wearable device accesses to the network via a mobile phone, thus being mainly used for the communication between a low mobile rate device and a low power device.

In order to support D2D communication, the communication system introduces sidelink in addition to the traditional uplink and downlink, where the sidelink is a communication link used for D2D communication between device and device.

Data retransmission mechanism based on hybrid automatic repeat request (HARQ) feedback are introduced on the sidelink. "Data retransmission mechanism based on HARQ feedback" refers to the receiving device of data performing HARQ feedback with respect to the sending device of data, in order to report to the sending device whether data is received correctly via the HARQ fed back. If it is determined via HARQ that the receiving device does not correctly receive the data, the sending device retransmits the data to the receiving device.

The method for data transmission provided by embodiments of the present application can be adapted to "data retransmission mechanism based on HARQ feedback" for transmitting data on the sidelink.

In the following, the transmission process of data on the sidelink will be briefly described in embodiments of the present application.

In practice, multiple protocol layers may be set in a communication device, where the multiple protocol layers may include a radio link control (RLC) layer and a media access control (MAC) layer. The service access point (SAP) between the RLC layer and the MAC layer is a logical channel. SAP refers to the logical interface between two adjacent protocol layers communicating with each other.

During the process of sending data on the sidelink, the MAC layer in the communication device may map data of the logical channel into the sidelink resource, thereby sending the data of the logical channel data via the sidelink resource.

In the following, the implementation environment involved in the method for data transmission provided by embodiments of the present application will be briefly described.

Figure 1:
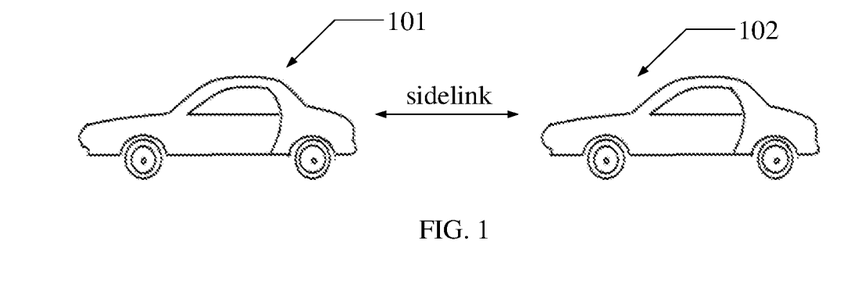
FIG. 1 is a schematic diagram of an application scenario of a method for data transmission provided by embodiments of the present application.

Referring to FIG. 1, it illustrates a possible implementation environment involved in embodiments of the present application. As shown in FIG. 1, the implementation environment may include a first user equipment (UE) 101 and a second UE 102, where the first UE 101 and the second UE 102 may perform D2D communication via sidelink.

Figure 2:
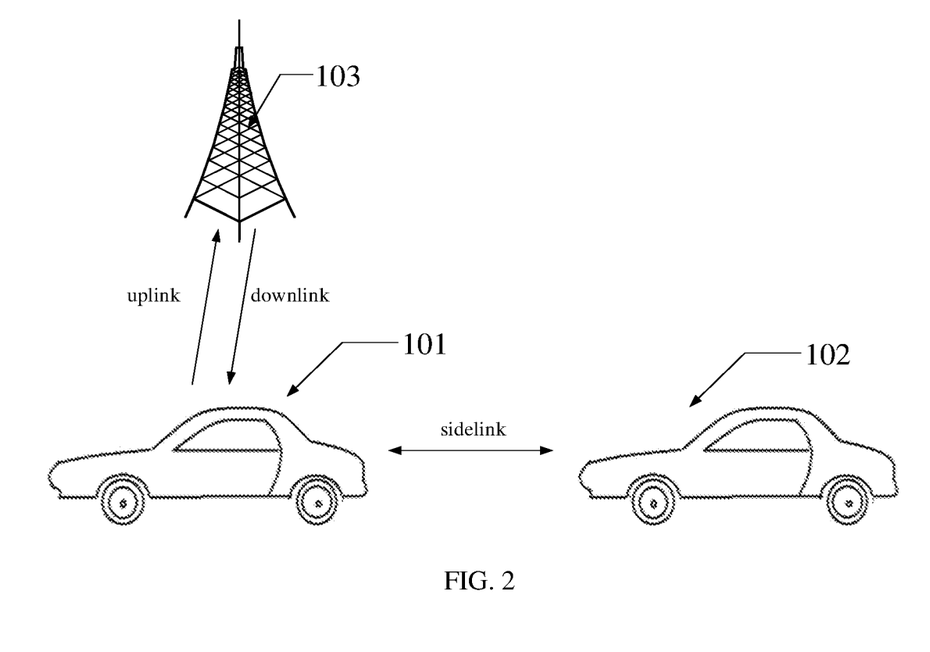
FIG. 2 is a schematic diagram of an application scenario of another method for data transmission provided by embodiments of the present application.

Referring to FIG. 2, it illustrates another possible implementation environment related to an embodiment of the present application. As shown in FIG. 2, The implementation environment may include the first UE 101, the second UE 102, and a base station 103. The first UE 101 and the second UE 102 may perform D2D communication via the sidelink. The first UE 101 may send data to the base station 103 via the uplink, and receive data sent by the base station 103 via the downlink.

It should be noted that, for the convenience of explanation, in embodiments of the present application, the first UE 101 is taken as the transmission device of data, and the second UE 102 is taken as the receiving device of data.

In practice, the first UE 101 and the second UE 102 may be a smartphone, a computer, a multimedia player, an e-reader, a wearable device, a sensor device, a vehicle or an on-board terminal, etc. The base station 103 may be gNB or eNB.

Figure 3:
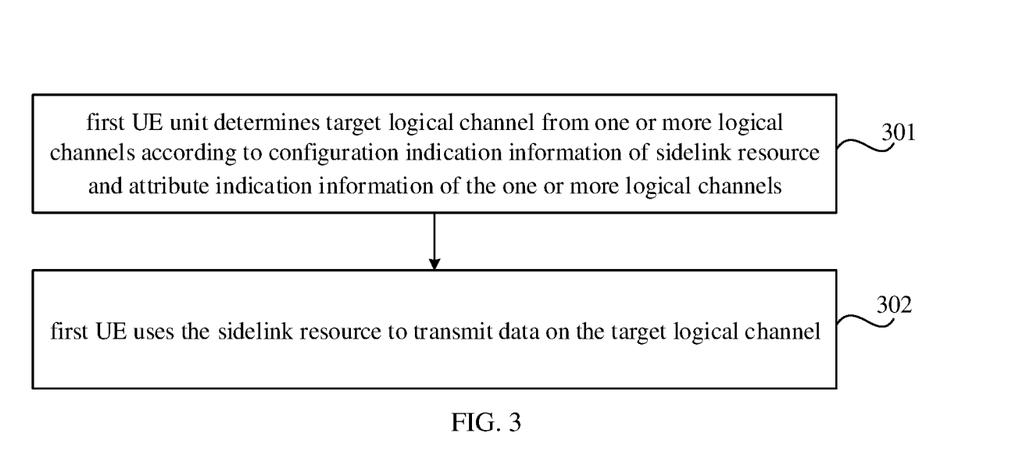
FIG. 3 is a flowchart of a method for data transmission provided by embodiments of the present application.

Referring to FIG. 3, it illustrates a flow chart of a method for data transmission provided by embodiments of the present application. The method for data transmission may be applied to the first UE 101 in the implementation environment shown in FIG. 1 or FIG. 2. As shown in FIG. 3, the method for data transmission may include the following steps 301 and 302.

In step 301, the first UE determines a target logical channel from one or more logical channels according to configuration indication information of a sidelink resource and attribute indication information of the one or more logical channels.

Specifically, the sidelink resource in the step 301 (for the convenience of explanation, referred to as the target sidelink resource in the following method embodiments) refers to a communication resource on sidelink used to carry data sent by the first UE to the second UE.

In a possible implementation, the target sidelink resource may be a resource allocated by the base station to the first UE.

Optionally, the target sidelink resource may be a resource dynamically allocated by the base station to the first UE. For example, the first UE may send a scheduling request to the base station via the uplink before sending data to the second UE. After receiving the scheduling request, the base station may allocate the target sidelink resource to the first UE according to the scheduling request. The first UE may send data to the second UE via the allocated target sidelink resource.

Optionally, the target sidelink resource may also be a resource semi-statically assigned by the base station to the first UE. The first UE may send data to the second UE via the target sidelink resource semi-statically allocated by the base station.

In another possible implementation, the target sidelink resource may be a resource selected by the first UE from a sidelink resource pool.

Optionally, the sidelink resource pool includes a plurality of sidelink resources, and the first UE may select the target sidelink resource from the plurality of sidelink resources to send data to the second UE via the target sidelink resource.

The configuration indication information described in the step 301 is used to indicate configuration characteristics of the target sidelink resource, where the configuration characteristics may be configuration characteristics related to HARQ feedback.

Optionally, if the target sidelink resource is the resource allocated by the base station to the first UE, the first UE may receive the configuration indication information sent by the base station to the first UE in the process of allocating the target sidelink resources.

Optionally, if the target sidelink resource is the resource selected by the first UE from the sidelink resource pool, the first UE may obtain the configuration indication information from the sidelink resource pool.

In an alternative embodiment of the present application, the configuration indication information may be sent by a lower layer of the first UE to an upper layer of the first UE. For example, the configuration indication information may be sent by a physical layer (PHY layer) of the first UE to an MAC layer of the first UE. In this case, the step 301 may be performed by the upper layer (e. g., the MAC layer) of the first UE.

In an alternative embodiment of the present application, the configuration indication information may indicate at least one of the following information A1, B1, and C1.

Information A1: whether the target sidelink resource is configured with a respective physical sidelink feedback channel (PSFCH) resource.

PSFCH is a physical channel used on sidelink to transmit HARQ.

If the target sidelink resource is configured with the respective PSFCH resource, after the first UE transmits data to the second UE via the target sidelink resource, the second UE may perform HARQ feedback with respect to the first UE via the respective PSFCH resource. On the contrary, if the target sidelink resource is not configured with the respective PSFCH resource, after the first UE transmits data to the second UE via the target sidelink resource, the second UE will not be able to perform HARQ feedback with respect to the first UE.

Information B1: whether the target sidelink resource is configured with a respective physical uplink control channel (PUCCH) resource.

PUCCH is a physical channel used on uplink to transmit control data.

In one possible case, if the first UE determines that the second UE do not successfully receive data sent by the first UE based on the HARQ fed back from the second UE, the first UE needs to send a scheduling request to the base station via the PUCCH resource, so that the base station allocates a sidelink resource to the first UE according to the scheduling request, and the first UE may retransmit data to the second UE via the sidelink resource allocated by the base station.

According to the above description, if the target sidelink resource is configured with the respective PUCCH resource, the first UE may send the scheduling request to the base station via the PUCCH resource to achieve data retransmission, in the case that the second UE does not successfully receive data sent by the first UE. If the target sidelink resource is not configured with the respective PUCCH resource, the first UE should not be able to send the scheduling request to the base station, and then the first UE should not be able to achieve data retransmission.

Information C1: a type of data that the target sidelink resource is able to carry.

The type may include at least one of a type requiring HARQ feedback and a type requiring no HARQ feedback.

In addition, the attribute indication information of each logical channel may indicate whether data on the logical channel requires HARQ feedback.

In practice, the type of data in different logical channels varies. In one possible case, data on some logical channels requires the receiving device to perform HARQ feedback. For example, some data of higher importance may require the receiving device to perform HARQ feedback, while data on some logical channels does not require the receiving device to perform HARQ feedback. For example, some data of lower importance does not require the receiving device to perform HARQ feedback.

The attribute indication information of each logical channel may be used to indicate whether data on the logical channel requires HARQ feedback.

In step 302, the first UE transmits data on the target logical channel using the target sidelink resource.

As described above, in step 301, the first UE may determine the target logical channel from the one or more logical channels according to the configuration indication information and the attribute indication information of the one or more logical channels. After determining the target logical channel, the first UE may map the data on the target logical channel to the target sidelink resource, so as to transmit the data on the target logical channel via the target sidelink resource. Optionally, the first UE may map the data on the target logical channel to the target sidelink resource via the MAC layer.

As described above, the configuration indication information may be sent from the lower layer of the first UE to the upper layer of the first UE. Then, the step 301 may be performed by the upper layer of the first UE. That is, the target logical channel may be determined by the upper layer of the first UE. In this case, after determining the target logical channel, the upper layer of the first UE may send the attribute indication information of the target logical channel to the lower layer. For example, if step 301 is performed by the MAC layer of the first UE, then the MAC layer, after determining the target logical channel, may send the attribute indication information of the target logical channel to the PHY layer.

The lower layer of the first UE, after receiving the attribute indication information of the target logical channel, may generate HARQ feedback indication information based on the attribute indication information, and map the HARQ feedback indication information to the target sidelink resource, for transmitting the HARQ feedback indication information to the second UE via the target sidelink resource. The HARQ feedback indication information is used to indicate whether the second UE needs to perform HARQ feedback with respect to the first UE.

For example, the HARQ feedback indication information may occupy one bit. When the HARQ feedback indication information is 0, it indicates that the second UE does not need to perform HARQ feedback with respect to the first UE. When the HARQ feedback indication information is 1, it indicates that the second UE needs to perform HARQ feedback with respect to the first UE.

Embodiments of the present application provide three exemplary modes for the first UE to determine the target logical channel from respective logical channels. Each of the three modes will be described in the following, in some embodiments of the present application.

First mode: when the information indicated by the configuration indication information satisfies a first condition, the first UE selects, from the one or more logical channels, a logical channel whose attribute indication information indicates requiring no HARQ feedback as the target logical channel.

Optionally, the first UE may select one or more logical channels whose attribute indication information indicates requiring no HARQ feedback as the target logical channel. For the ease of description, the logical channel(s) whose attribute indication information indicates requiring no HARQ feedback is referred to as a first logical channel in the following method embodiments for short.

Optionally, the first condition may be at least one of the following conditions A2, B2, and C2.

Condition A2: the configuration indication information indicates that the target sidelink resource is not configured with the respective PSFCH resource.

As described above, if the target sidelink resource is not configured with the respective PSFCH resource, the second UE will be unable to perform HARQ feedback with respect to the first UE after the first UE transmits data to the second UE via the target sidelink resource. Considering this situation, in the case that the target sidelink resource is not configured with the respective PSFCH resource, the first UE may select the first logical channel as the target logical channel and transmit data on the target logical channel via the target sidelink resource.

Condition B2: the configuration indication information indicates that the target sidelink resource is not configured with the respective PUCCH resource.

As described above, if the target sidelink resource is not configured with the respective PUCCH resource, the first UE is unable to realize retransmission of data. Since the first UE is unable to realize retransmission of data, it is not necessary for the second UE to perform HARQ feedback with respect to the first UE. Considering this situation, in the case that the target sidelink resource is not configured with the respective PUCCH resource, the first UE may select the first logical channel as the target logical channel and transmit the data on the target logical channel via the target sidelink resource.

Condition C2: the configuration indication information indicates that the type of data that the target sidelink resource can carry is the type requiring no HARQ feedback.

Since the target sidelink resource can only carry data that requires no HARQ feedback, in this case, the first UE may select the first logical channel as the target logical channel and transmit the data on the target logical channel via the target sidelink resource.

According to the above description, if the configuration indication information indicates that the target sidelink resource is not configured with the respective PSFCH resource, the first UE may select the first logical channel as the target logical channel. If the configuration indication information indicates that the target sidelink resource is not configured with the respective PUCCH resource, the first UE may select the first logical channel as the target logical channel. If the configuration indication information indicates that the type of data that the target sidelink resource can carry is the type requiring no HARQ feedback, the first UE may select the first logical channel as the target logical channel.

Second mode: when the information indicated by the configuration indication information satisfies a second condition, the first UE selects, from the one or more logical channels, a logical channel whose attribute indication information indicates requiring HARQ feedback as the target logical channel.

Optionally, the first UE may select one or more logical channels whose attribute indication information indicates requiring HARQ feedback as the target logical channel. For the ease of description, the logical channel(s) whose attribute indication information indicates requiring HARQ feedback is referred to as a second logical channel in the following method embodiments for short.

Optionally, the second condition refers to the configuration indication information indicating that the type of data that the target sidelink resource can carry is the type requiring HARQ feedback.

Since the target sidelink resource can only carry data that requires HARQ feedback, in this case, the first UE may select the logical channel that requires HARQ feedback as the target logical channel and transmit data on the target logical channel via the target sidelink resource.

According to the above description, if the configuration indication information indicates that the type of data that the target sidelink resource can carry is the type requiring HARQ feedback, the first UE may select the second logical channel as the target logical channel.

Third mode: when the information indicated by the configuration indication information satisfies a third condition, the first UE selects the first logical channel or the second logical channel among the one or more logical channels as the target logical channel.

That is, in the third mode, the first UE may select one of the first logical channel and the second logical channel as the target logical channel.

Optionally, the third condition may be at least one of the following conditions A3, B3, and C3.

Condition A3: the configuration indication information indicates that the type of data that the target sidelink resource can carry includes the type requiring HARQ feedback and the type requiring no HARQ feedback.

Since the target sidelink resource can carry both data requiring HARQ feedback and data requiring no HARQ feedback, in this case, the first UE may select the first logical channel or the second logical channel as the target logical channel and transmit data on the target logical channel via the target sidelink resource.

Condition B3: the configuration indication information indicates that the target sidelink resource is configured with the respective PSFCH resource.

As described above, if the target sidelink resource is configured with the respective PSFCH resource, after the first UE transmits data to the second UE via the target sidelink resource, the second UE may perform HARQ feedback with respect to the first UE via the respective PSFCH resource. Considering this situation, the first UE may select the first logical channel or the second logical channel as the target logical channel and transmit data on the target logical channel via the target sidelink resource.

The reason for not restricting the first UE to only select the second logical channel as the target logical channel in this case is that: if such a restriction is made, the first UE would not be able to use the target sidelink resource to transmit data when only the first logical channel exists, which would result in a waste of communication resources.

Condition C3: the configuration indication information indicates that the target sidelink resource is configured with the respective PUCCH resource.

As described above, if the target sidelink resource is configured with the respective PUCCH resource, the first UE may send the scheduling request to the base station via the PUCCH resource in the case that the second UE does not successfully receive the data sent by the first UE, thereby achieving retransmission of data. Since the first UE may achieve retransmission of data when the target sidelink resource is configured with the respective PUCCH resource, in this case, the second UE may perform HARQ feedback with respect to the first UE. Considering this situation, the first UE may select the first logical channel or the second logical channel as the target logical channel and transmit data on the target logical channel via the target sidelink resource.

Similarly to the above, the reason for not restricting the first UE to only select the second logical channel as the target logical channel in this case is that: if such a restriction is made, the first UE would not be able to use the target sidelink resource to transmit data when only the first logical channel exists, which would result in a waste of communication resources.

It should be noted that in the third mode, the first UE may prioritize selection of the second logical channel as the target logical channel. Thus, it is ensured that when the target sidelink resource is suitable for transmitting data requiring HARQ feedback, the data requiring HARQ feedback is transmitted in priority, thereby avoiding the data requiring HARQ feedback being affected by the lack of a suitable sidelink resource.

In one embodiment of the present application, the prioritizing selection of the second logical channel as the target logical channel may be accomplished in the following ways.

In a first way, when the second logical channel does not exist in the respective logical channels, the first UE selects the first logical channel in the respective logical channels as the target logical channel.

In other words, only when the second logical channel does not exist in the first UE, the first UE can transmit data on the first logical channel via the target sidelink resource. When the second logical channel exists in the first UE, the first UE is prohibited from transmitting data on the first logical channel via the target sidelink resource. In such way, prioritized transmission of data on the second logical channel may be achieved.

In a second way, when the first logical channel and the second logical channel simultaneously exist among the one or more logical channels, and a priority of the first logical channel is the same as that of the second logical channel, the first UE selects the second logical channel as the target logical channel.

According to the above description, if the configuration indication information indicates that the target sidelink resource is configured with the respective PSFCH resource, the first UE may prioritize selection of the second logical channel as the target logical channel. If the configuration indication information indicates that the target sidelink resource is configured with the respective PUCCH resource, the first UE may prioritize selection of the second logical channel as the target logical channel. If configuration indication information indicates that the type of data that the target sidelink resource can carry includes the type requiring no HARQ feedback and the type requiring HARQ feedback, the first UE may prioritize selection of the second logical channel as the target logical channel.

In addition, in a third way, the first UE may further determine the target logical channel according to the priorities of the first logical channel and the second logical channel Optionally, when the first logical channel and the second logical channel simultaneously exist among the one or more logical channels, and a priority of the first logical channel is different from that of the second logical channel, the first UE selects the logical channel with a higher priority as the target logical channel.

It should be understood that although various steps in the flowchart of FIG. 3 are shown in sequence as indicated by arrows, these steps are not necessarily performed in the order indicated by the arrows. Unless otherwise stated herein, there is no strict sequential restriction on the execution of these steps, and these steps may be performed in another order. Moreover, at least some of the steps in FIG. 3 may include multiple sub-steps or multiple stages that are not necessarily executed at the same time but may be performed at different times. These multiple sub-steps or stages are not necessarily performed sequentially, but may be performed in turn or alternately with other steps or at least a part of the sub-steps or stages of other steps.

Figure 4:
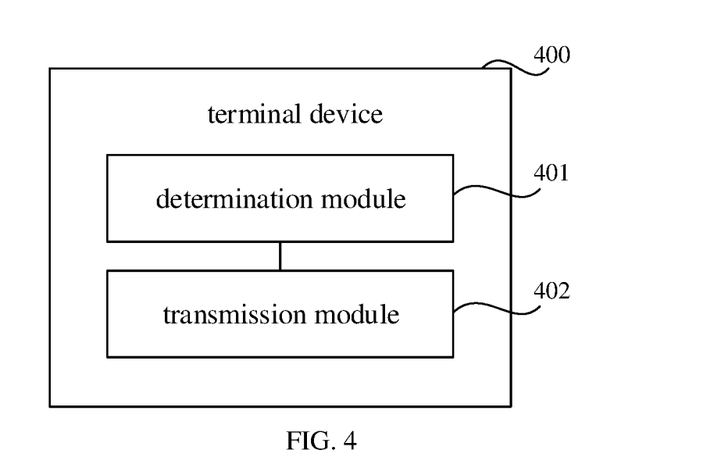
FIG. 4 is a block diagram of a terminal device provided by embodiments of the present application.

Referring to FIG. 4, it shows a block diagram of a terminal device 400 as provided by embodiments of the present application. As shown in FIG. 4, the terminal device 400 may include a determination module 401 and a transmission module 402.

The determination module 401 is configured to determine a target logical channel from one or more logical channels according to configuration indication information of a sidelink resource and attribute indication information corresponding to the one or more logical channels. The configuration indication information is used to indicate configuration characteristics of the sidelink resource, and the attribute indication information of each logical channel is used to indicate whether data on the logical channel requires hybrid automatic repeat request (HARQ) feedback.

The transmission module 402 is configured to transmit data on the target logical channel using the sidelink resource.

In one embodiment of the present application, the configuration indication information is used to indicate at least one of:

information about whether the sidelink resource is configured with a respective physical sidelink feedback channel (PSFCH) resource;

information about whether the sidelink resource is configured with a respective physical uplink control channel (PUCCH) resource; and information about a type of data that the sidelink resource can carry, including at least one of a type requiring HARQ feedback and a type requiring no HARQ feedback.

In one embodiment of the present application, the determination module 401 is specifically configured to select a logical channel whose attribute indication information indicates requiring no HARQ feedback as the target logical channel, when the information indicated by the configuration indication information satisfies a first condition.

In one embodiment of the present application, the first condition refers to at least one of:

the configuration indication information indicating that the sidelink resource is not configured with the respective PSFCH resource;

the configuration indication information indicating that the sidelink resource is not configured with the respective PUCCH resource; and the configuration indication information indicating that the type of data that the sidelink resource can carry is the type requiring no HARQ feedback.

In one embodiment of the present application, the determination module 401 is specifically configured to select a logical channel whose attribute indication information indicates requiring HARQ feedback as the target logical channel, when the information indicated by the configuration indication information satisfies a second condition.

In one embodiment of the present application, the second condition refers to the configuration indication information indicating that the type of data that the sidelink resource can carry is the type requiring HARQ feedback.

In one embodiment of the present application, the determination module 401 is specifically configured to select a logical channel whose attribute indication information indicates requiring HARQ feedback or a logical channel whose attribute indication information indicates requiring no HARQ feedback as the target logical channel, when the information indicated by the configuration indication information satisfies a third condition.

In one embodiment of the present application, the third condition refers to at least one of:

the configuration indication information indicating that the type of data that the sidelink resource can carry includes the type requiring HARQ feedback and the type requiring no HARQ feedback;

the configuration indication information indicating that the sidelink resource is configured with the respective PSFCH resource; and the configuration indication information indicating that the sidelink resource is configured with the respective PUCCH resource.

In one embodiment of the present application, the determination module 401 is specifically configured to prioritize selection of the logical channel whose attribute indication information indicates requiring HARQ feedback as the target logical channel.

In one embodiment of the present application, the determination module 401 is specifically configured to select a logical channel whose attribute indication information indicates requiring no HARQ feedback as the target logical channel, when the logical channel whose attribute indication information indicates requiring HARQ feedback does not exist among the one or more logical channels.

In one embodiment of the present application, the determination module 401 is specifically configured to select a logical channel whose attribute indication information indicates requiring HARQ feedback as the target logical channel, when the logical channel whose attribute indication information indicates requiring HARQ feedback and the logical channel whose attribute indication information indicates requiring no HARQ feedback simultaneously exist among the one or more logical channels, and a priority of the logical channel whose attribute indication information indicates requiring HARQ feedback is the same as a priority of the logical channel whose attribute indication information indicates requiring no HARQ feedback.

In one embodiment of the present application, the determination module 401 is specifically configured to select the logical channel with a higher priority as the target logical channel, when the logical channel whose attribute indication information indicates requiring HARQ feedback and the logical channel whose attribute indication information indicates requiring no HARQ feedback simultaneously exist among the one or more logical channels, and a priority of the logical channel whose attribute indication information indicates requiring HARQ feedback is different from a priority of the logical channel whose attribute indication information indicates requiring no HARQ feedback.

In one embodiment of the present application, the sidelink resource is a resource allocated by a base station to a user device (UE). Alternatively, the sidelink resource is a resource selected by the UE from a sidelink resource pool.

In one embodiment of the present application, the determination module 401 is specifically configured to prioritize selection of the logical channel whose attribute indication information indicates requiring HARQ feedback as the target logical channel, when the configuration indication information indicates that the sidelink resource is configured with a respective physical sidelink feedback channel (PSFCH) resource.

In one embodiment of the present application, the determination module 401 is specifically configured to prioritize selection of the logical channel whose attribute indication information indicates requiring HARQ feedback as the target logical channel, when the configuration indication information indicates that the sidelink resource is configured with a respective physical uplink control channel (PUCCH) resource.

In one embodiment of the present application, the determination module 401 is specifically configured to select a logical channel whose attribute indication information indicates requiring no HARQ feedback as the target logical channel, when the configuration indication information indicates that the sidelink resource is not configured with a respective physical sidelink feedback channel (PSFCH) resource.

In one embodiment of the present application, the determination module 401 is specifically configured to select a logical channel whose attribute indication information indicates requiring no HARQ feedback as the target logical channel, when the configuration indication information indicates that the sidelink resource is not configured with a respective physical uplink control channel (PUCCH) resource.

In one embodiment of the present application, the determination module 401 is specifically configured to: select a logical channel whose attribute indication information indicates requiring no HARQ feedback as the target logical channel, when the configuration indication information indicates that a type of data that the sidelink resource can carry is a type requiring no HARQ feedback; select a logical channel whose attribute indication information indicates requiring HARQ feedback as the target logical channel, when the configuration indication information indicates that the type of data that the sidelink resource can carry is a type requiring HARQ feedback; and prioritize selection of the logical channel whose attribute indication information indicates requiring HARQ feedback as the target logical channel, when the configuration indication information indicates that the type of data that the sidelink resource can carry includes the type requiring HARQ feedback and the type requiring no HARQ feedback.

Figure 5:
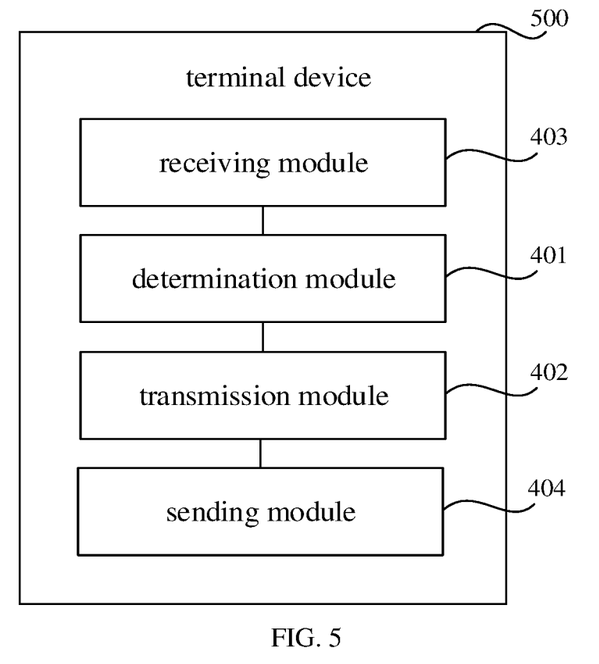
FIG. 5 is a block diagram of another terminal device provided by embodiments of the present application.

Referring to FIG. 5, it illustrates a block diagram of another terminal device 500 provided by embodiments of the present application. As shown in FIG. 5, in addition to the respective modules included in the terminal device 400, optionally, the terminal device 500 may further include a receiving module 403 and a sending module 404.

The receiving module 403 is configured to receive the configuration indication information sent by a lower layer.

The sending module 404 is configured to send the attribute indication information of the target logical channel to the lower layer.

The above division of the respective modules in the terminal device is for illustrative purposes only. In other embodiments, the terminal device may be divided into different modules as required to perform all or part of functions of the terminal device.

The specific restriction for the terminal device may refer to the above restriction for the method for data transmission, and will not be repeated here. Respective modules of the above terminal device may be implemented in whole or in part by means of software, hardware and a combination thereof. The above respective modules may be embedded into or independent of a processor of terminal device in form of hardware, or may be stored in the memory of the terminal device in form of software, in order to facilitate the processor to call and perform operations corresponding to the above various modules.

Figure 6:
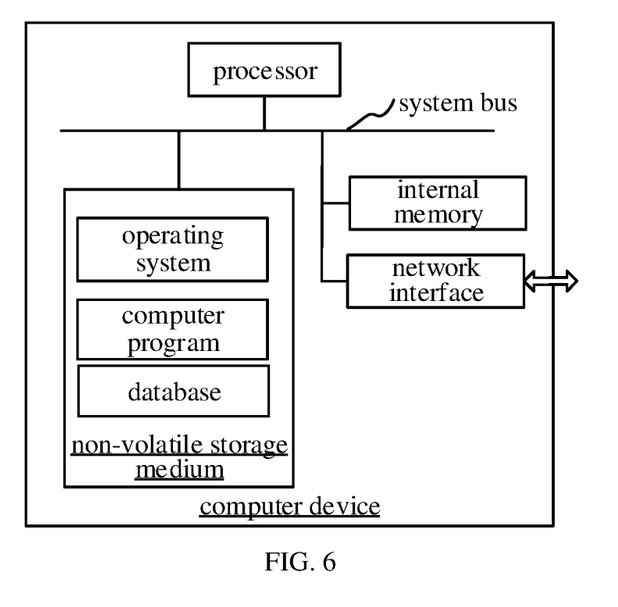
FIG. 6 is a block diagram of a terminal device provided by an embodiment of the present application.

In one embodiment, a terminal device is provided, the internal structure of which may be illustrated in FIG. 6. The terminal device includes a processor, a memory, and a network interface connected via a system bus. The processor of the terminal device is used to provide computing and control capabilities. The memory of the terminal device includes a non-volatile storage medium, and an internal memory. The non-volatile storage medium stores an operating system, a computer program, and a database. The internal memory provides an environment for the operation of the operating system and the computer program in the non-volatile storage medium. The database of the terminal device is used to store the resource query processing data. The network interface of the terminal device is used to communicate with an external terminal device via a network connection. The computer program is executed by the processor to implement a method for data transmission.

It will be understood by those skilled in the art that the structure shown in FIG. 6 is merely a block diagram of a partial structure associated with the present application and does not constitute a limitation to the terminal device to which the present application is applied. A specific terminal device may include more or fewer components than those shown in the figures, or a combination of certain components, or have a different arrangement of components.

In one embodiment of the present application, there is provided a terminal device including a memory and a processor. The memory has a computer program stored therein. The processor is configured to execute the computer program to implement the method shown in any of the method embodiments described above.

For example, the processor implements the following steps when executing the computer program: determining a target logical channel from one or more logical channels according to configuration indication information of a sidelink resource and attribute indication information of the one or more logical channels, where the configuration indication information is used to indicate configuration characteristics of the sidelink resource, and the attribute indication information of each logical channel is used to indicate whether data on the logical channel requires hybrid automatic repeat request (HARQ) feedback; and transmitting data on the target logical channel using the sidelink resource.

The above embodiment provides a terminal device which is implemented in a similar principle and implements a similar technical effect as the method embodiments described above and will not be repeated herein.

In one embodiment of the present application, there is provided a computer readable storage medium on which a computer program is stored. The computer program is configured to implement the method shown in any of the above method embodiments when executed by a processor.

For example, the computer program, when executed by the processor, may implement the following steps: determining a target logical channel from one or more logical channels according to configuration indication information of a sidelink resource and attribute indication information of the one or more logical channels, where the configuration indication information is used to indicate configuration characteristics of the sidelink resource, and the attribute indication information of each logical channel is used to indicate whether data on the logical channel requires hybrid automatic repeat request (HARQ) feedback; and transmitting data on the target logical channel using the sidelink resource.

The above embodiment provides a computer readable storage medium which is implemented in a similar principle and implements a similar technical effect as the method embodiments described above and will not be repeated herein.

In one embodiment of the present application, there is provided a chip including a programmable logic circuit and/or program instructions. The chip is configured to implement the method shown in any of the above method embodiments when running.

For example, the chip can achieve the following steps when running determining a target logical channel from one or more logical channels according to configuration indication information of a sidelink resource and attribute indication information of the one or more logical channels, where the configuration indication information is used to indicate configuration characteristics of the sidelink resource, and the attribute indication information of each logical channel is used to indicate whether data on the logical channel requires hybrid automatic repeat request (HARQ) feedback; and transmitting data on the target logical channel using the sidelink resource.

The above embodiment provides a chip which is implemented in a similar principle and implements a similar technical effect as the method embodiments described above and will not be repeated herein.

Those of ordinary skill in the art may understand that all or part of the processes implementing the methods of the above embodiments may be performed by means of a computer program to instruct the relevant hardware(s). The computer program may be stored in a non-volatile computer readable storage medium that, when executed, may include processes such as described in each of the above method embodiments. Any reference to a memory, storage, database, or other medium used in embodiments provided by the present application may include a non-volatile and/or volatile memory. The non-volatile memory may include a read-only memory (ROM), a programmable ROM (PROM), an erasable programmable ROM (EPROM), an electrically erasable programmable ROM (EEPROM), or a flash memory. The volatile memory may include a random access memory (RAM) or an external buffer memory. As an illustration rather than limitation, RAM is available in various forms, such as a static RAM (SRAM), a dynamic RAM (DRAM), a synchronous DRAM (SDRAM), a dual data rate SDRAM (DDRSDRAM), an enhanced SDRAM (ES-DRAM), a Synchlink DRAM (SLDRAM), a rambus direct RAM (RDRAM), a direct rambus dynamic RAM (DRDRAM), and a rambus dynamic RAM (RDRAM), and the like.

It should be understood that the terms "first", "second" and the like used in the present application may be used herein to describe various devices, but these devices are not limited by these terms. These terms are only used to distinguish a first device from another device. For example, without departing from the scope of the present application, a first UE may be referred to as a second UE, and similarly, a second UE may be referred to as a first UE. The first UE and the second UE are both UEs, but they are not the same UE.

The above described embodiments express only several implements of the present application, which are described in a more specific and detailed way, but should not be understood as a limitation to the scope of the present application. It should be noted that for a person of ordinary skill in the art, several variations and improvements can be made without departing from the conception of the present application, which fall within the protection scope of the present application. Therefore, the protection scope of the present application should be subject to the protection scope of the claims.

What is claimed is:

1. A method for data transmission, comprising:
   determining a target logical channel from one or more logical channels according to configuration indication information of a sidelink resource and attribute indication information of the one or more logical channels, wherein the configuration indication information is configured to indicate configuration characteristics of the sidelink resource, and the attribute indication information of each logical channel is configured to indicate whether data on the logical channel requires hybrid automatic repeat request (HARQ) feedback; and transmitting data on the target logical channel using the sidelink resource, wherein the configuration indication information is configured to indicate:

information about whether the sidelink resource is configured with a respective physical sidelink feedback channel (PSFCH) resource, wherein in response to the configuration indication information indicating that the sidelink resource is configured with the respective PSFCH resource, the determining the target logical channel from the one or more logical channels according to the configuration indication information of the sidelink resource and the attribute indication information of the one or more logical channels, comprises:

selecting a logical channel whose attribute indication information indicates requiring HARQ feedback or a logical channel whose attribute indication information indicates requiring no HARQ feedback as the target logical channel, wherein the selecting the logical channel whose attribute indication information indicates requiring HARQ feedback or the logical channel whose attribute indication information indicates requiring no HARQ feedback as the target logical channel, comprises:

in response to the logical channel whose attribute indication information indicates requiring HARQ feedback and the logical channel whose attribute indication information indicates requiring no HARQ feedback simultaneously existing among the one or more logical channels, and in response to a priority of the logical channel whose attribute indication information indicates requiring HARQ feedback being different from a priority of the logical channel whose attribute indication information indicates requiring no HARQ feedback, selecting the logical channel with a higher priority as the target logical channel.

2. The method according to claim 1, further comprising: receiving the configuration indication information sent by a lower layer.

3. The method according to claim 1, further comprising: sending the attribute indication information of the target logical channel to a lower layer.

4. The method according to claim 1, wherein in response to the configuration indication information indicating that the sidelink resource is not configured with the respective PSFCH resource, the determining the target logical channel from the one or more logical channels according to the configuration indication information of the sidelink resource and the attribute indication information of the one or more logical channels, comprises:

selecting a logical channel whose attribute indication information indicates requiring no HARQ feedback as the target logical channel.

5. The method according to claim 1, wherein the determining the target logical channel from the one or more logical channels according to the configuration indication information of the sidelink resource and the attribute indication information of the one or more logical channels, comprises:

in response to the information indicated by the configuration indication information satisfying a second condition, selecting a logical channel whose attribute indication information indicates requiring HARQ feedback as the target logical channel.

6. The method according to claim 5, wherein the second condition refers to the configuration indication information indicating that the type of data that the sidelink resource is able to carry is the type requiring HARQ feedback.

7. The method according to claim 1, wherein the sidelink resource is a resource allocated by a base station to a user equipment (UE); or the sidelink resource is a resource selected by the UE from a sidelink resource pool.

8. A terminal device, comprising a memory and a processor, wherein the memory is configured to store a computer program, and the processor is configured, when executing the computer program, to perform operations of:

determining a target logical channel from one or more logical channels according to configuration indication information of a sidelink resource and attribute indication information of the one or more logical channels, wherein the configuration indication information is configured to indicate configuration characteristics of the sidelink resource, and the attribute indication information of each logical channel is configured to indicate whether data on the logical channel requires hybrid automatic repeat request (HARQ) feedback; and transmitting data on the target logical channel using the sidelink resource, wherein the configuration indication information is configured to indicate:

information about whether the sidelink resource is configured with a respective physical sidelink feedback channel (PSFCH) resource, wherein in response to the configuration indication information indicating that the sidelink resource is configured with the respective PSFCH resource, the operation of determining the target logical channel from the one or more logical channels according to the configuration indication information of the sidelink resource and the attribute indication information of the one or more logical channels, comprises:

selecting a logical channel whose attribute indication information indicates requiring HARQ feedback or a logical channel whose attribute indication information indicates requiring no HARQ feedback as the target logical channel, wherein the selecting the logical channel whose attribute indication information indicates requiring HARQ feedback or the logical channel whose attribute indication information indicates requiring no HARQ feedback as the target logical channel, comprises:

in response to the logical channel whose attribute indication information indicates requiring HARQ feedback and the logical channel whose attribute indication information indicates requiring no HARQ feedback simultaneously existing among the one or more logical channels, and in response to a priority of the logical channel whose attribute indication information indicates requiring HARQ feedback being different from a priority of the logical channel whose attribute indication information indicates requiring no HARQ feedback, selecting the logical channel with a higher priority as the target logical channel.

9. The terminal device according to claim 8, the processor is further configured, when executing the computer program, to perform an operation of:

receiving the configuration indication information sent by a lower layer.

10. The terminal device according to claim 8, the processor is further configured,
when executing the computer program, to perform an operation of:
sending the attribute indication information of the target logical channel to a lower layer.

11. The terminal device according to claim 8, wherein in response to the configuration indication information indicating that the sidelink resource is not configured with the respective PSFCH resource, the operation of determining the target logical channel from the one or more logical channels according to the configuration indication information of the sidelink resource and the attribute indication information of the one or more logical channels, comprises:
selecting a logical channel whose attribute indication information indicates requiring no HARQ feedback as the target logical channel.

12. The terminal device according to claim 8, wherein the operation of determining the target logical channel from the one or more logical channels according to the configuration indication information of the sidelink resource and the attribute indication information of the one or more logical channels, comprises:
in response to the information indicated by the configuration indication information satisfying a second condition, selecting a logical channel whose attribute indication information indicates requiring HARQ feedback as the target logical channel.

13. The terminal device according to claim 12, wherein the second condition refers to the configuration indication information indicating that the type of data that the sidelink resource is able to carry is the type requiring HARQ feedback.

14. The terminal device according to claim 8, wherein
the sidelink resource is a resource allocated by a base station to a user equipment (UE); or
the sidelink resource is a resource selected by the UE from a sidelink resource pool.

\* \* \* \* \*